(12) United States Patent
Pugh et al.

(10) Patent No.: US 6,234,745 B1
(45) Date of Patent: May 22, 2001

(54) CONTAINER DESTACKING AND TRANSFER APPARATUS

(75) Inventors: Ronnie C. Pugh; Lyn E. Lewelling; Charles D. Pierce; Brownie S. McBride, all of Ft. Smith, AR (US)

(73) Assignee: Ergonomic Design Specialties, Inc., Fort Smith, AR (US)

( * ) Notice: Subject to any disclaimer, the term of this patent is extended or adjusted under 35 U.S.C. 154(b) by 0 days.

(21) Appl. No.: 09/515,034

(22) Filed: Mar. 6, 2000

(51) Int. Cl.[7] .................................................. B65G 59/02
(52) U.S. Cl. ...................................... 414/796.9; 414/794.5
(58) Field of Search ............................... 414/794.5, 796.9

(56) References Cited

U.S. PATENT DOCUMENTS

| | | |
|---|---|---|
| 3,534,872 * | 10/1970 | Roth et al. ..................... 414/796.9 X |
| 3,687,306 * | 8/1972 | Ransom ......................... 414/796.9 X |
| 3,698,707 * | 10/1972 | Lucas ............................. 414/794.5 X |
| 3,776,393 | 12/1973 | Bargstedt . |
| 3,780,884 | 12/1973 | Jones . |
| 3,904,024 | 9/1975 | Smith . |
| 3,931,897 | 1/1976 | Bacon et al. . |
| 4,302,142 | 11/1981 | Kuhl et al. . |
| 4,303,365 | 12/1981 | Euverard et al. . |
| 4,355,936 | 10/1982 | Thomas et al. . |

FOREIGN PATENT DOCUMENTS

| | | | |
|---|---|---|---|
| 223123 | 8/1962 | (AT) . | |
| 3527902 * | 2/1987 | (DE) ................................ | 414/794.5 |
| 58-193836 * | 11/1983 | (JP) ................................ | 414/796.9 |
| 4-217516 * | 8/1992 | (JP) ................................ | 414/796.9 |

* cited by examiner

*Primary Examiner*—Janice L. Krizek
(74) *Attorney, Agent, or Firm*—Akin, Gump, Strauss, Hauer & Feld, LLP

(57) ABSTRACT

A conveyor and transfer apparatus for transferring containers seriatim from a substantially vertical stack of containers includes an endless belt conveyor pivotally mounted on a frame for movement between elevated and declined positions by opposed hydraulic actuators. The conveyor includes a frame for supporting a carriage thereon for movement along guide tracks forming part of the carriage support frame between a position wherein opposed container gripping arms may be actuated to grip a container and a position for depositing the container on a conveyor belt. A hydraulic linear actuator moves the carriage between its working positions and opposed gripper arms are actuated by respective cylinder and piston type actuators to move between container gripping and release positions. A programmable logic controller is adapted to control operation of the apparatus through a hydraulic control circuit in response to actuation of limit switches by the carriage, by the carriage engaging a container and by elevation or declination of the conveyor, together with appropriate time delays in a working cycle of the apparatus.

28 Claims, 6 Drawing Sheets

CONTAINER DESTACKING AND TRANSFER APPARATUS

FIELD OF THE INVENTION

The present invention pertains to an apparatus for handling containers by removing the containers seriatim from a stack of containers and transferring the containers to a conveyor part of the apparatus.

BACKGROUND

Certain material or article handling operations require transferring articles, such as containers or trays, from a stack of such articles to further material handling equipment, such as conveyors and the like. Manually unstacking or destacking various kinds of containers, for example, and transferring them to a conveyor or the like can be an arduous task. In volume production of various articles, such as frozen foodstuffs, for example, the foodstuffs are moved from one phase of production to another in vertically stackable containers or trays and these trays must be unstacked and moved seriatim to another location for further processing of the foodstuffs contained in the trays. In order to increase the speed with which sets of vertically stacked trays may be unstacked and transferred to conveyor equipment, for example, it is desirable to alleviate the hazards and fatigue brought on by manual handling of such containers or trays. Accordingly, there has been a need to provide material handling apparatus which is particularly adapted to remove containers or trays from stacks of such trays and transfer the containers or trays to a substantially horizontal conveyor for further handling or transport. It is to these ends that the present invention has been developed.

SUMMARY OF THE INVENTION

The present invention provides an apparatus for handling articles, such as containers or trays, for example, wherein the apparatus removes the containers or trays, seriatim from vertical stacks of same and transfers the containers or trays to a generally horizontal conveyor.

In accordance with one aspect of the present invention, an apparatus is provided for destacking and transferring vertically stacked containers by gripping the containers, one at a time, moving the containers vertically upward to remove them from the stack and transferring the containers to a conveyor. The apparatus is adapted to adjust its working position to engage each container in the stack, one after the other, lift the containers seriatim from the stack and transfer the containers to a conveyor forming part of the apparatus.

In accordance with another aspect of the invention, an apparatus is provided which automatically unstacks or destacks a vertically arranged set of containers and transfers the containers seriatim to a substantially horizontal conveyor automatically until the entire stack of trays or containers has been transferred. In particular, the apparatus includes a generally horizontally movable carriage having a gripper assembly with retractable gripping arms mounted thereon which are adapted to grip a tray or container, remove the tray or container from a stack of same, transfer the tray or container to a generally horizontal conveyor and release the tray or container for movement along the conveyor. The apparatus is particularly adapted to rapidly repeat the operating cycle until each tray or container in a stack has been transferred to a conveyor.

Still further, the present invention provides a tray or container handling apparatus which is operated by pressure fluid energized actuators for sequentially for gripping containers, transferring containers to a conveyor and conveying the containers along the conveyor. The apparatus may be controlled to automatically complete an operating cycle and repeat the operating cycle of transferring a container from a stack of same to a conveyor apparatus until the stack of trays or containers has been transferred Those skilled in the art will further appreciate the inventive features and important aspects of the present invention upon reading the detailed description which follows in conjunction with the drawing.

DETAILED DESCRIPTION OF A PREFERRED EMBODIMENT

Figure 1:
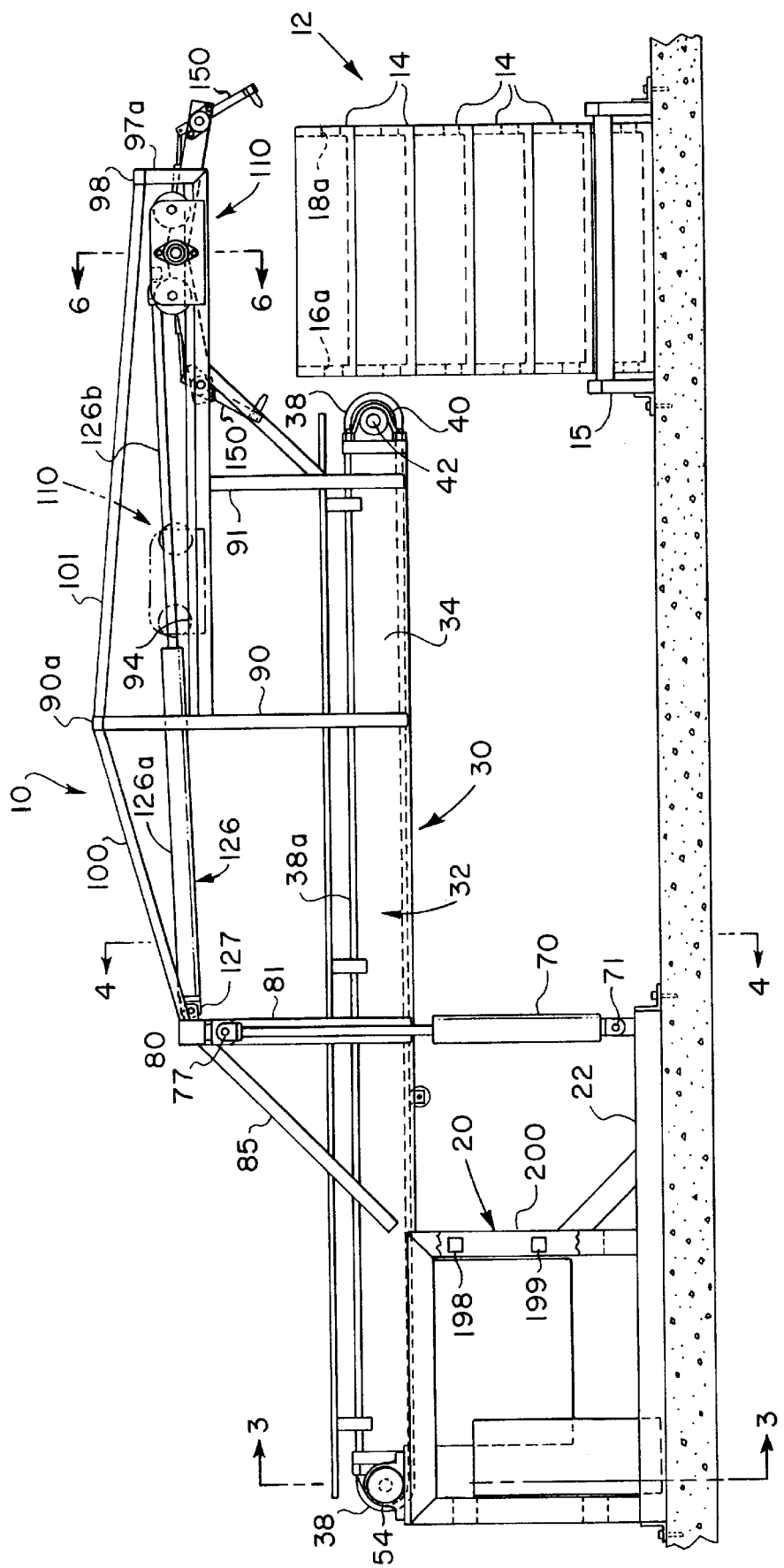
FIG. 1 is a side elevation of the apparatus of a present invention.

In the description which follows, like parts are marked throughout the specification and drawing with the same reference numerals, respectively. The drawing figures may not necessarily be to scale and certain elements may be shown in generalized or schematic form in the interest of clarity and conciseness.

Figure 2:
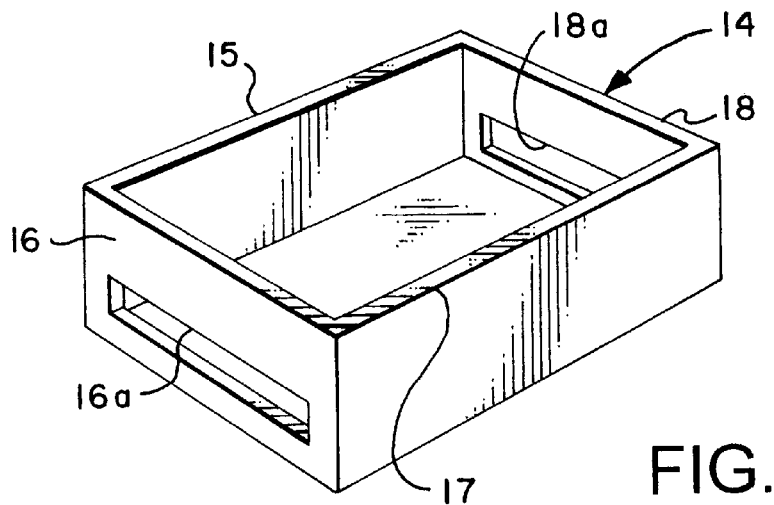
FIG. 2 is a perspective view of a typical container adapted to be handled by the apparatus shown in FIG. 1.
Figure 5:
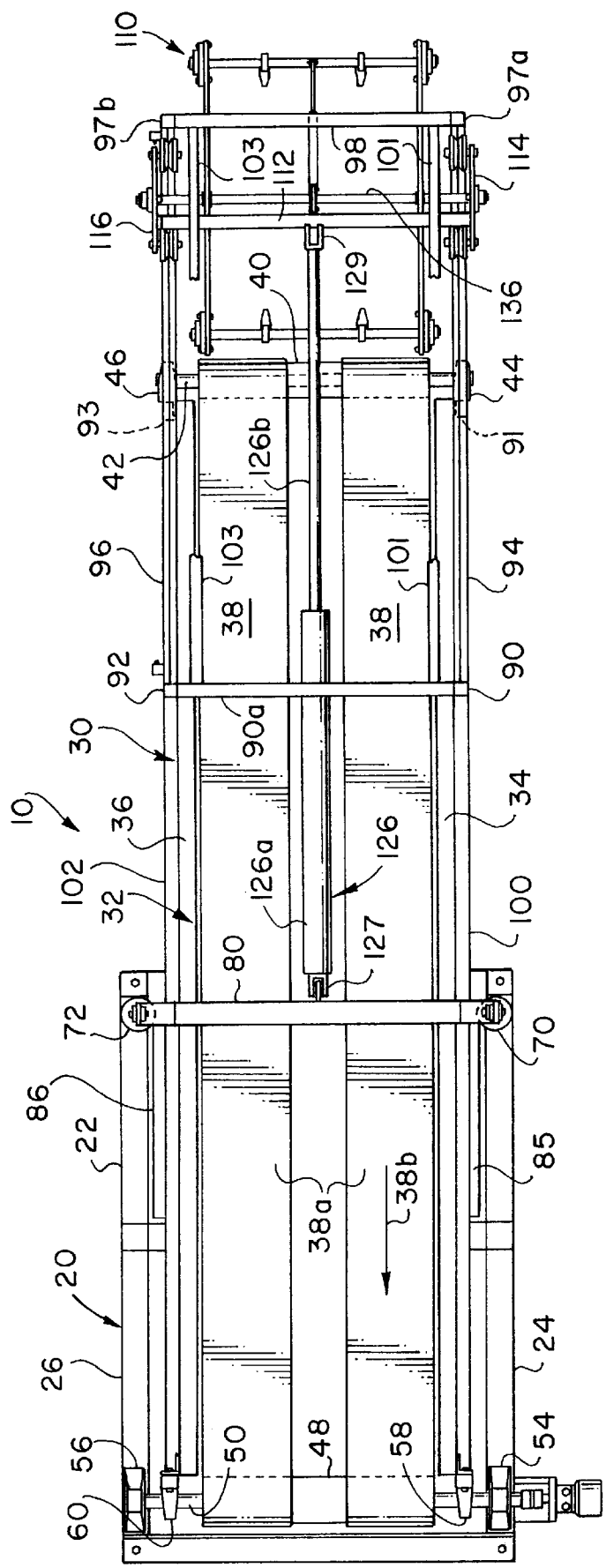
FIG. 5 is a top plan view of the apparatus of the present invention.

Referring to FIGS. 1 and 5, there is illustrated a material handling apparatus in accordance with the present invention characterized as an apparatus for destacking vertical stacks of trays or containers and transferring the trays or containers to a conveyor. For purposes of discussion herein, the description of the apparatus shown in FIGS. 1 and 5, which is generally designated by the numeral 10, will be described for an embodiment which is particularly adapted to transfer containers or baskets of frozen foodstuffs from a stack of containers 12 as shown in FIG. 1. The container stack 12 is made up of a plurality of vertically stacked open top containers 14 which, as shown in FIG. 2, are preferably characterized as generally rectangular, box-like containers disposed in a stack locator dock or frame 15, FIG. 1. Containers 14 include opposed sides 15 and 17 and opposed, upstanding end portions or handles 16 and 18, each provided with one or more generally rectangular openings 16a and 18a, formed therein, respectively. Those skilled in the art will recognize that other configurations of containers or trays may be handled by the apparatus 10 in accordance with the invention.

Figure 3:
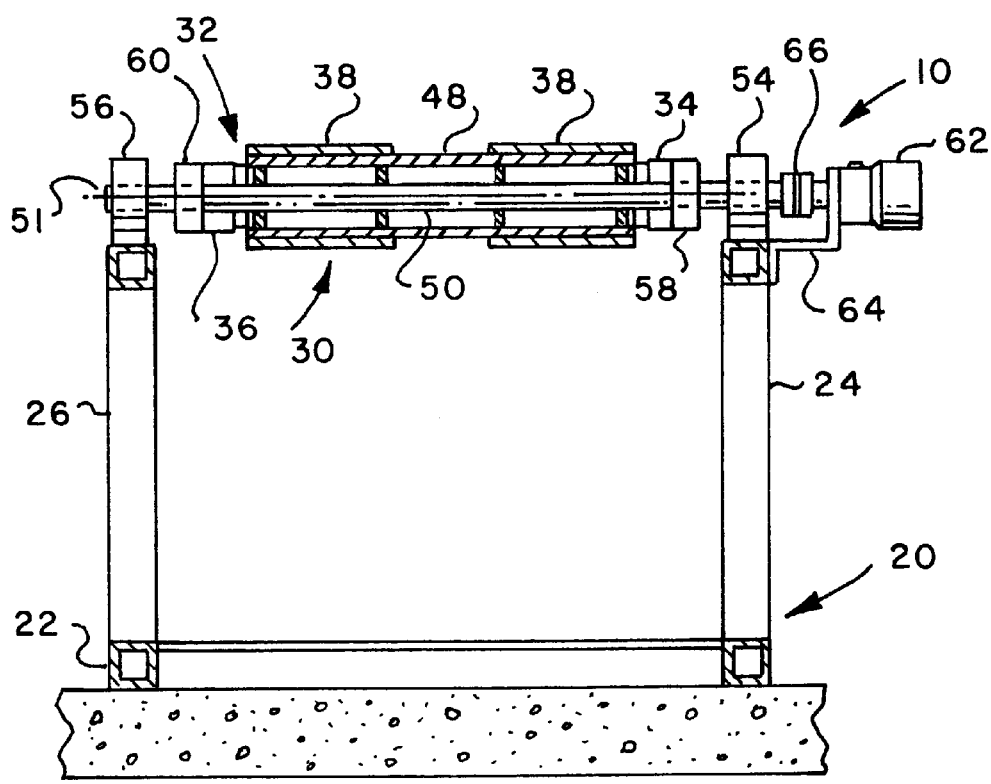
FIG. 3 is a section view taken generally along the line 3—3 of FIG. 1.

Referring further to FIGS. 1 and 5, the apparatus 10 includes a support frame 20 comprising an elongated base part 22 and spaced apart upstanding frame members 24 and 26, see FIG. 3 also. The frame 20 is adapted to support an elongated, endless belt type conveyor 30 including a conveyor frame 32, FIG. 1, preferably characterized by spaced apart parallel extending frame members 34 and 36, see FIGS. 3 and 4 also, suitably interconnected and adapted to support two spaced apart endless belts or chains 38. Endless belts 38 are trained around a first drum 40, rotatably mounted at one end of the conveyor 30 on a rotatable shaft 42, which shaft is supported in spaced apart bearings 44 and 46, see FIG. 5. The endless belts 38 are also supported at their opposite ends by a rotatable drum 48 mounted for rotation on and with a shaft 50, see FIG. 3 also.

Shaft 50 is supported for rotation on and with respect to the frame members 24 and 26 by suitable bearing assemblies 54 and 56, see FIG. 3. Shaft 50 is also connected to the frame 32 by suitable bearings 58 and 60, FIGS. 3 and 5, which are connected, respectively, to frame members 34 and 36. Accordingly, one end of conveyor 30 is supported on the frame 20 by shaft 50. As shown in FIGS. 3 and 5, the shaft 50 is rotatably driven by a pressure fluid motor 62 mounted on a suitable support 64 comprising part of the frame 20. Motor 62 is drivably coupled to shaft 50 by way of a suitable coupling 66.

Figure 4:
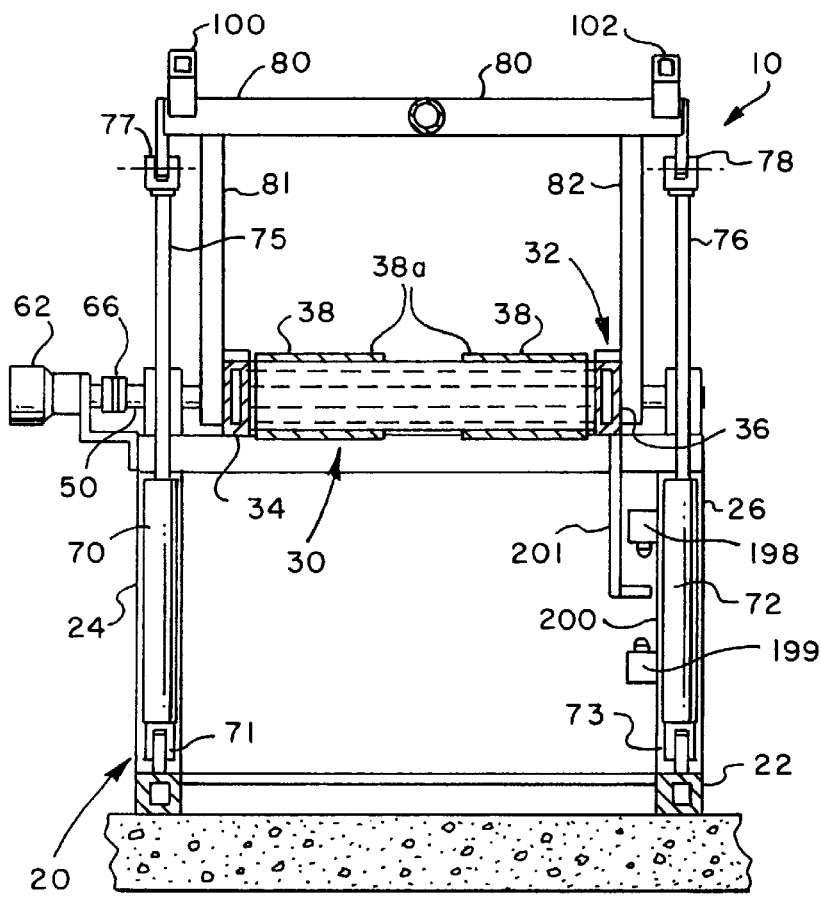
FIG. 4 is a view taken generally from the line 4—4 of FIG. 1.

Conveyor 30 is also operable to be pivoted about the central axis 51 of shaft 50, FIG. 3, to a selected working position by spaced apart upstanding pressure fluid cylinder type linear actuators 70 and 72, see FIGS. 4 and 5. Linear actuators 70 and 72 are suitably connected to frame member 22 at clevis type connections 71 and 73. Extensible piston rods 75 and 76 of actuators 70 and 72 are connected at their distal ends by clevis type connections 77 and 78 to a transverse frame member 80 disposed above the conveyor 30 and supported by spaced apart upstanding frame members 81 and 82 connected to conveyor frame members 34 and 36, respectively. Diagonal braces 85 and 86 also assist in supporting the transverse frame member 80. Accordingly, the conveyor 30 may be supported in a selected horizontal, angular declined or angular inclined position, depending on extension of the actuators 70 and 72, by pivoting the conveyor frame 32 about the central axis 51 of shaft 50.

Referring further to FIGS. 1 and 5, the conveyor frame 32 is further characterized by spaced apart upstanding frame members 90 and 91 connected to frame member 34 and frame members 92 and 93 connected to frame member 36. Frame members 90, 91, 92 and 93 support generally horizontally extending guide and support tracks 94 and 96 which are spaced apart and extend parallel to the longitudinal extent of conveyor 30. A transverse member 90a interconnects members 90 and 92. Tracks 94 and 96 are coextensive and are interconnected at their distal ends by spaced apart upstanding frame members 97a and 97b which are interconnected by transverse frame member 98. Longitudinal frame braces 100 and 101 extend between frame members 80 and 90 and between frame members 90a and 98, respectively, generally along one side of conveyor 30 and corresponding longitudinal braces 102 and 103 extend generally along and beyond the end of conveyor 30 on the opposite side thereof and interconnect frame members 80 and 92 and frame members 90a and 98, respectively.

Referring further to FIGS. 1 and 5, a container pickup and transfer carriage 110 is mounted on the apparatus 10 and is moveable along the tracks 94 and 96 between the position shown by the solid lines in FIGS. 1 and 5 and a position directly over conveyor belts 38, including the upper runs 38a thereof, as shown by the alternate position lines in FIG. 1, for removing a container 14 from the stack 12 and transferring a container 14 to the conveyor 30. Carriage 110 is adapted to repeat its pickup, transfer and release duties until a stack of containers 14 has been completely transferred to the conveyor 30 and moved onto further conveyor means, for example, not shown in the drawings hereof.

Figure 5A:
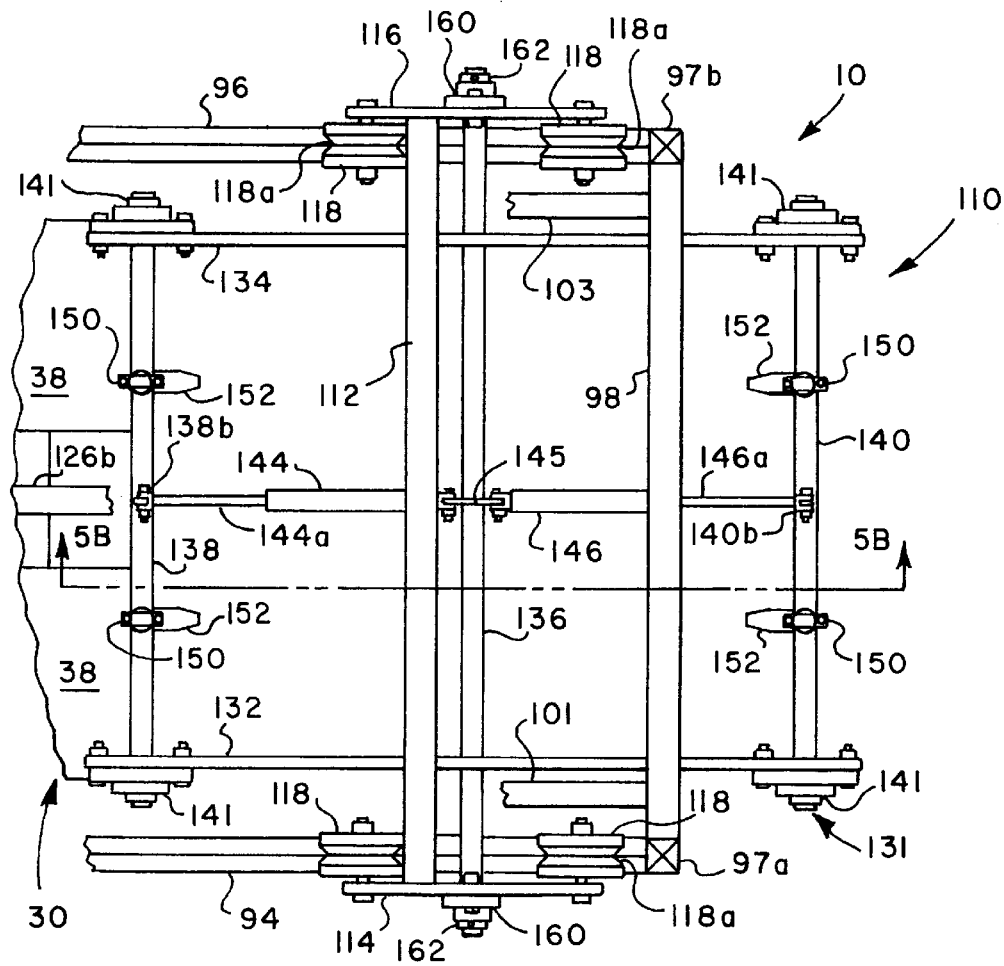
FIG. 5A is a top plan view of the transfer carriage on a larger scale.
Figure 5B:
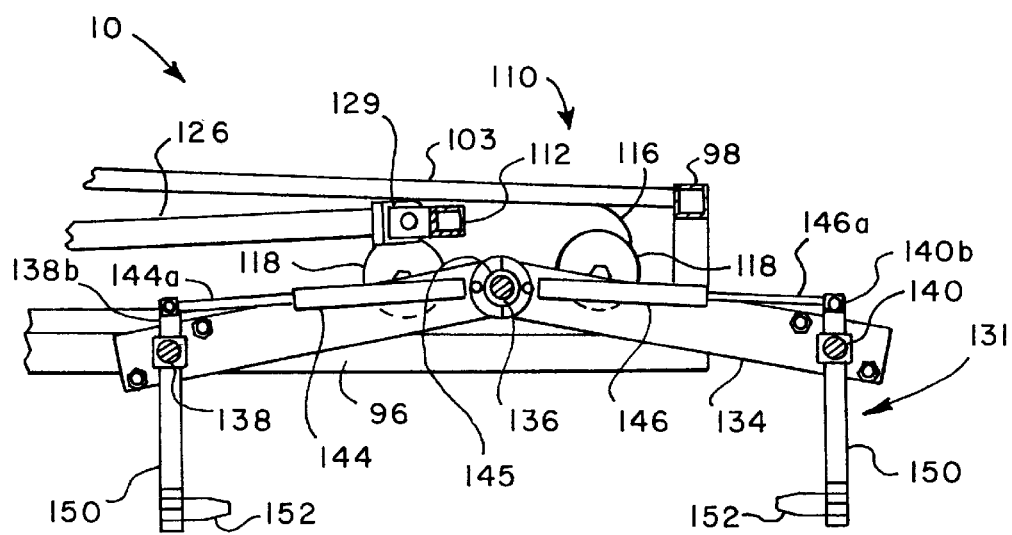
FIG. 5B is a section view taken from line 5B—5B of FIG. 5A.

Referring to FIGS. 5A and 5B, in particular, carriage 110 is characterized by a frame comprising a transverse frame member 112, which is connected at its opposite ends to elongated generally flat parallel frame plates 114 and 116.

Figure 6:
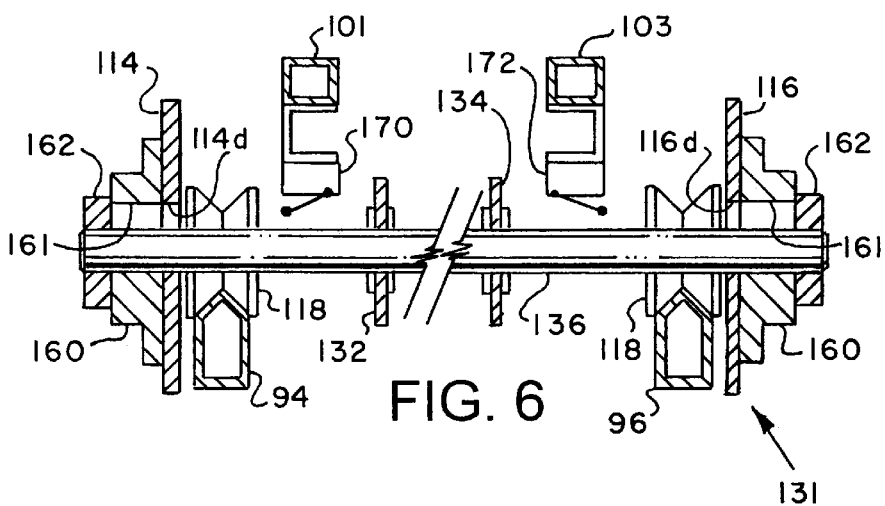
FIG. 6 is a section view taken generally along the line 6—6 of FIG. 1.

Frame plates 114 and 116, each support two spaced apart rotatable carriage wheels 118, as shown. Carriage wheels 118 each include a V-shaped cross section groove 118a formed therein for engagement with the upwardly pitched tracks 94 and 96, as shown in FIG. 6, by way of example. Accordingly, the carriage 110 is essentially journaled for linear movement along the tracks 94 and 96 between the position shown in FIGS. 1 and 5 and the alternate position shown, as indicated by the alternate position lines in FIG. 1. Movement of carriage 110 is provided by an elongated pressure fluid cylinder and piston type linear actuator 126 having a cylinder 126a connected at one end to frame member 80 by a clevis type connection 127, FIGS. 1 and 5. Piston rod 126b of actuator 126 is connected at its distal end to carriage frame member 112 at a clevis type connection 129, FIG. 5B. Accordingly, extension and retraction of piston rod 126b with respect to cylinder 126a moves the carriage 110 between its working positions shown and described.

Referring further to FIGS. 5A, 5B and 6, carriage 110 includes a container gripper assembly 131 comprising spaced apart gripper arms 132 and 134 which are mounted on a shaft 136 extending between and supported on the frame plates 114 and 116. Arms 132 and 134 extend from shaft 136 in opposite directions respectively, and also support spaced apart pivot shafts 138 and 140 adjacent the respective opposed distal ends of the arms 132 and 134 Shafts 138 and 140 are supported for rotation on arms 132 and 134 by suitable bearings 141 mounted on the respective arms 132 and 134, as shown. Shafts 138 and 140 are connected to opposed pressure fluid cylinder type linear actuators 144 and 146. Actuators 144 and 146 are connected at their cylinder ends to a bracket 145 mounted on shaft 136 and have their respective piston rods 144a and 146a connected at the distal ends thereof, respectively, to crank arms 138b and 140b secured to and operable to rotate the pivot shafts 138 and 140. Pivot shafts 138 and 140 each support spaced apart depending gripper arms 150 for rotational movement with the respective pivot shafts. Each of the arms 150 includes a laterally projecting finger or hook portion 152, as illustrated, for engagement with the handle portions 16 and 18 of a container 14 at the respective openings 16a and 18a. Accordingly, actuators 144 and 146 may have their piston rods retracted to rotate the shafts 138 and 140 in opposite directions to pivot the arms 150 and fingers 152 to an inclined position and clear of the handles 16 and 18 of containers 14, as shown in FIG. 1.

However, in response to downward movement of the carriage 110, by causing the actuators 70 and 72 to lower conveyor 30 and the structure supported thereby about the axis 51 of shaft 50 and until the arms 132 and 134 engage the horizontal top edges of container handles 16 and 18, the carriage 110 may be brought into proximity to the topmost container 14 in the stack 12. Containers 14 are stacked in locator dock 15 in such a way that, as the carriage 110 is lowered to engage the topmost container, the container sides 15 and 17 will clear the tracks 94 and 96. In fact, the container width between sides 15 and 17 is generally no greater than the distance between arms 132 and 134. In response to engagement of handles 16 and 18 by the arms 132 and 134, actuators 144 and 146 are energized to extend their respective piston rods to rotate the shafts 138 and 140 until the arms 150 are moved to a position wherein the fingers 152 project through the openings 16a and 18a of handles 16 and 18, respectively. In this position of the arms 150, the conveyor frame 32 may be moved by the actuators 70 and 72 to lift a container 14 engaged by the carriage 110 upwardly above the stack 12.

After lifting a container 14 off of stack 12, actuator 126 may be energized to retract its piston rod 126b to move the carriage 110 linearly along tracks 94 and 96 to the alternate position shown in FIG. 1 whereupon actuators 144 and 146 may be energized to rotate the shafts 138 and 140 in the opposite direction to that just described to release the container 14 onto the conveyor belts 38 which may be moving in the direction of arrow 38b, see FIG. 1, to move the transferred container 14 along the conveyor to further handling or processing, as needed. When the carriage 110 has released container 14, the carriage is moved by actuator 126 to return to the position shown by the solid lines in FIGS. 1 and 2, while the arms 150 remain pivoted into a generally outwardly inclined position, whereupon the actuators 70 and 72 are energized or allowed to lower conveyor 30 until the carriage 110 and gripper assembly 131 again engages the next container 14 now on top of the stack 12.

Referring now to FIG. 6, the shaft 136 is supported on the frame plates 114 and 116 in spaced apart bearings 160 mounted on the frame plates and which have elongated shaft receiving slots 161 formed therein, respectively, and aligned with corresponding slots 114d and 116d in the frame plates. Suitable removable retainer caps 162 are secured to and maintain the shaft 136 journaled in the bearings 160. Accordingly, gripper assembly 131, including shaft 136 and the arms 132 and 134 may move vertically relative to the carriage frame comprising the frame member 112 and the opposed frame plates 114 and 116. As shown in FIG. 6, suitable limit switches 170 and 172 are supported by the braces 101 and 103 and are adapted to be engaged by the shaft 136 when it moves upwardly in the elongated bearing slots 161 upon engagement of the arms 132 and/or 134 with the handle 16 and/or 18 of a container 14 which is next to be picked up by the apparatus 10. Accordingly, limit switches 170 and 172 are operable to provide signals to a suitable control system to be described in further detail herein to indicate that the gripper assembly 131 is in engagement with a container 14.

Upon receipt of signals from the limit switches 170 and/or 172, the aforementioned control system is operable to energize the actuators 144 and 146 to rotate the shafts 138 and 140 and the arms 150 into a position whereby the fingers 152 engage the container 14, or a similar container, as previously described. A suitable time delay may be provided by the aforementioned control system to allow the gripper assembly 131 on carriage 110 to firmly grip a container 14 whereupon the actuators 70 and 72 may then be energized to lift the container connected to the carriage 110 upwardly off of the stack 12, followed by energization of cylinder actuator 126 to move the carriage and the container 14 connected thereto to a position for depositing the container onto the conveyor belts 38.

Figure 7:
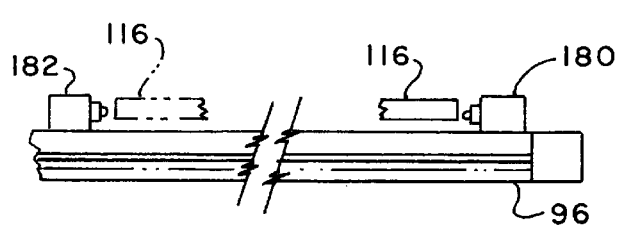
FIG. 7 is a detail view showing the location of limit switches for the transfer carriage of the apparatus shown in FIGS. 1 and 5.

As shown in FIG. 7, movement of the carriage 110 between its working positions is sensed by spaced apart limit switches 180 and 182 which may be suitably mounted on the conveyor 30, such as alongside the track 96 at suitable positions therealong, and adapted to engage frame plate 116 of carriage 110, as illustrated. Accordingly, carriage 110 engages limit switch 182 when moved to a position to release a container 14 and limit switch 182 will deliver a suitable signal to the aforementioned control system to provide for causing actuators 144 and 146 to release the container for deposition on conveyor 30.

When a container 14 has been released after a suitable time delay, actuator 126 is energized to move carriage 110 back to the position shown by the solid lines in FIGS. 1 and 5. As frame plate 116 engages limit switch 180, a signal is delivered to the aforementioned control system to deenergize actuator 126 and energize actuators 70 and 72 in a manner to allow these actuators to lower the conveyor 30 until the gripper assembly 131 engages the handles 16 and/or 18 of a container 14 sufficiently to move shaft 136 upwardly in its support bearings 160 to engage one or both of limit switches 170 and 172. Once this action takes place, one or both of limit switches 170 and 172 provide a signal to the aforementioned control system to cause the gripper arms 150 to be rotated into positions to grip the next container 14 now engaged by the carriage 110 and the cycle just described is repeated.

The apparatus 10 is operable to destack and transfer containers 14 seriatim to conveyor 30 for movement therealong in response to driving engagement thereof by motor 62. As shown in FIG. 4, spaced apart limit switches 198 and 199 are mounted on a suitable support part 200 of frame 20 to sense the position of the conveyor 30 and to control maximum extension and retraction of the linear actuators 70 and 72. Accordingly, when limit switch 199 is engaged by a member 201 mounted on conveyor frame 32, a signal, indicative of the fact that all containers 14 have been destacked, is sent to the aforementioned control system to shut down operation of apparatus 10 until a new stack of containers is positioned in the locating frame 15 shown in FIG. 1. Typically, the conveyor 30, is elevated to a predetermined starting position in preparation for the next stack of containers 14 to be positioned in dock 15. For example, limit switch 198 is engageable by member 201 to control maximum extension of actuators 70 and 72 so that conveyor 30 may be elevated about axis 51 to its maximum working position preparatory to a new stack of containers 14 being placed in position for transfer to the conveyor 30.

Figure 8:
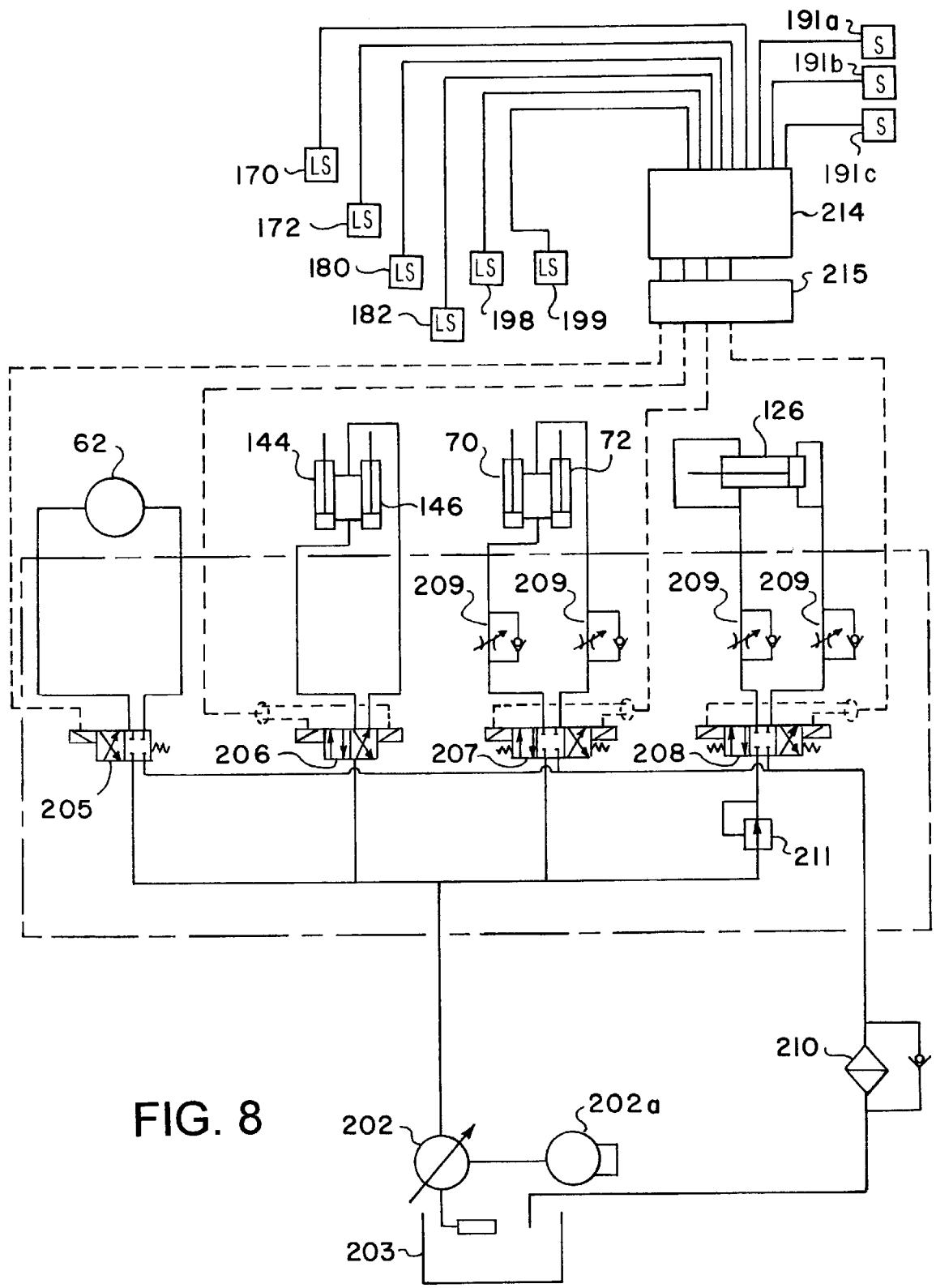
FIG. 8 is a schematic diagram of certain pressure fluid and electrical control components of the apparatus of the present invention.

Referring now to FIG. 8, there is illustrated a schematic diagram of a control system for the apparatus 10 wherein major elements of the system are indicated in generally schematic form. As shown in FIG. 8, the motor 62, actuators, 70, 72, 126, 144 and 146 are all in circuit with a hydraulic pump 202 which is suitably driven by an electric motor 202a and is adapted to receive hydraulic fluid from a suitable reservoir 203 for circulation under pressure to respective solenoid operated valves 205, 207, 208 and 206. Hydraulic fluid is circulated back to reservoir 203 by way of a suitable filter 210. Motor 62 is controlled by the two position valve 205 which is spring biased to a position to shut off fluid flow to or from the motor 62 and is solenoid actuated to a position to supply pressure fluid to drive the motor 62 for driving the conveyor belts 38 in the direction indicated in FIG. 1. FIG. 8 also illustrates the two position solenoid operated valve 206 for controlling extension and retraction of the actuators 144 and 146. Still further, the three position solenoid actuated valve 207 is operable to reside in a spring biased center position when not energized to block flow of pressure fluid to or from actuators 126, 70 and 72 to thereby hold the conveyor 30 in a desired elevated or declined position. Fluid flow limiters 209 may be interposed in the conduits leading to and from the actuators 70 and 72, as shown, to control the rate of movement of these actuators in both directions. A pressure regulator 211 limits the pressure of fluid flow to actuator 126 by way of the three position solenoid actuated and spring biased center position valve 208, similar to the valve 207, to control movement of actuator 126.

Operation of the motor 62, the actuators 70, 72, 144, 146 and 126 may be controlled by a suitable control device such as a commercially available programmable logic controller 214, FIG. 8. Programmable logic controller (PLC) 214 is operable to receive signals from limit switches 170, 172, 180, 182, 198 and 199, as indicated. PLC 214 is also operable to receive control signals from manual control switches 191a, 191b and 191c to start, stop and reset operation of the control system to control operation of the apparatus 10.

Operation of the apparatus 10 normally commences with the beginning of a cycle wherein the conveyor 30 is elevated until the limit switch 198 is actuated and the actuators 144 and 146 have retracted the arms 150 to the position shown in FIG. 1. Actuators 70 and 72 and motor 62 will be energized, upon actuation of switch 191a, to lower the conveyor 30 until the arms 132 and 134 engage a container 14, assuming that at least one container is held in the locator frame 15 to be picked up by the apparatus 10. Once either of limit switches 170 or 172 is engaged by shaft 136, a signal is sent to the PLC 214 to energize actuators 144 and 146 to rotate arms 150 into a position to grip the topmost container 14 in stack 12. After a suitable time delay to allow the gripping action to take place, PLC 214, acting through an interface circuit 215, provides suitable signals to solenoid operated valve 207 to effect lifting the conveyor 30 upwardly by actuators 70 and 72 a predetermined distance as determined by a time delay which commences with energization of valve 207. This time delay is sufficient to allow a container 14 to be lifted clear of the stack 12.

After the aforementioned time delay expires, the PLC 214 energizes cylinder actuator 126 by way of valve 208 to traverse the carriage 110 into a position over the conveyor runs 38a, as determined by limit switch 182. When limit switch 182 is actuated, a signal is transmitted to PLC 214 which causes PLC 214 to effect shifting of valve 206 to the opposite position to effect energization of actuators 144 and 146 whereby arms 150 rotate away from each other to release the container 14 onto the conveyor 30. Unless commanded otherwise, PLC 214 is operable to energize motor 62 by way of valve 205 to run continuously during operation of the apparatus 10.

When actuators 144 and 146 have been energized to effect release of a container 14 held by the carriage 110 and gripper assembly 131, actuator 126 is energized to move the carriage 110 back to the position shown in FIG. 1, after a suitable time delay commencing with release of a container from the carriage. When carriage 110 actuates limit switch 180, a signal is transmitted to the PLC 214 to energize actuators 70 and 72 by moving valve 207 to a position to allow pressure fluid to flow out of the cylinder actuators 70 and 72 also under the force of gravity acting on the conveyor 30 to lower the conveyor and the carriage 110 into engagement with the next container to be gripped by the assembly 131 whereupon the cycle just described repeats itself until the last container is removed from the locator dock 15. If no container is present in the locator dock 15, the apparatus 10 will, upon being lowered by the actuators 70 and 72, cause limit switch 199 to be actuated. The apparatus 10 will then be moved to a starting position by energizing actuators 70 and 72 to lift the conveyor 30 and the carriage 110 supported thereby until limit switch 198 is engaged, for example which will effect providing a signal to PLC 214 to cause the PLC to deenergize valve 207. Actuators 70 and 72 and conveyor 30 are then in a position whereby the carriage 110 will be clear of a succeeding stack of containers to be moved into the locator dock 15. After a new stack of containers 14 is moved into position, the apparatus 10 may be controlled by manual start switch 191a, FIG. 8, to commence a new operating cycle.

At any time during operation of the apparatus 10, the control system may be operated by switch 191b to stop the system or by switch 191c to reset the apparatus for a new operating cycle by raising the conveyor 30 to its upper limit position and moving the carriage 110 in the position shown in FIGS. 1 and 5 but with the gripper arms 150 in a retracted position. Suitable controls such as a low oil level sensor for the reservoir 203 and an oil heater for the reservoir 203, both not shown, may be included in the control system shown in FIG. 8, if desired.

The apparatus 10 and the control system therefor may be constructed of conventional engineering components and materials used for mechanical conveyor devices and systems and the like. The control system illustrated in FIG. 8 may be provided utilizing commercially available components for each of the electrical devices, the solenoid operated valves and the pressure fluid operated cylinder and piston type actuators. The motor driven pump 202 and the hydraulic motor 62 may also comprise conventional commercially available devices.

Although a preferred embodiment of a tray or container destacking, transfer and conveyor apparatus has been described in accordance with the specification and drawings herein, those skilled in the art will recognize that various substitutions and modifications may be made to the invention without departing from the scope and spirit of the appended claims.

What is claimed is:

1. An apparatus for unstacking and transferring a container from a stack of said containers comprising:

an apparatus frame;

a conveyor mounted on said apparatus frame for conveying containers seriatim from said stack;

a carriage including a carriage frame and a container gripper mounted thereon, said carriage being mounted for movement relative to said conveyor between a first position for gripping and removing a container from said stack and a second position for depositing said container on said conveyor;

said conveyor includes a conveyor frame for supporting said carriage for movement between said first position for engaging and gripping a container and said second position for depositing said container on said conveyor; and said gripper comprises an elongated gripper shaft mounted on said carriage frame for limited movement relative to said carriage frame in response to engagement of said container by said gripper, said gripper shaft supporting spaced apart arms which support container gripping fingers thereon, and said gripping fingers being movable between a first position for releasing said container and a second position for gripping said container.

2. The apparatus set forth in claim 1 wherein:

said apparatus includes a control system including spaced apart sensors mounted on said apparatus and responsive to movement of said gripper shaft to provide a control signal to effect movement of said gripping fingers into gripping engagement with said container.

3. The apparatus set forth in claim 1 wherein:

said gripper shaft is mounted in opposed bearings spaced apart on and supported by said carriage frame, said opposed bearings being configured to allow limited lateral movement of said gripper shaft with respect to said opposed bearings, respectively.

4. The apparatus set forth in claim 1 wherein:

said carriage frame includes roller means supported on spaced parallel tracks on said conveyor frame for supporting said carriage on said conveyor.

5. The apparatus set forth in claim 1 including:

pressure fluid actuator means on said carriage for moving said gripping fingers between said positions.

6. The apparatus set forth in claim 5 wherein:

said gripping fingers are mounted on opposed rotatable support shafts supported on said opposed arms of said gripper, spaced apart from each other, and said pressure fluid actuator means on said carriage is operable to rotate said support shafts to move said gripping fingers between said first and second positions.

7. The apparatus set forth in claim 1 including:

an actuator for moving said carriage between said first and second positions of said carriage.

8. The apparatus set forth in claim 7 wherein:

said actuator for moving said carriage comprises an elongated cylinder and piston type linear actuator.

9. An apparatus for unstacking and transferring a container from a stack of said containers comprising:

an apparatus frame;

a conveyor mounted on said apparatus frame for conveying containers seriatim from said stack;

a carriage including a container gripper mounted thereon, said carriage being mounted on said conveyor for movement relative to said conveyor between a first position for gripping and removing a container from said stack and a second position for depositing said container on said conveyor; and said conveyor is mounted on said apparatus frame for movement between an elevated position and a declined position with respect to said apparatus frame to enable said container gripper to engage successive ones of containers disposed in said stack.

10. The apparatus set forth in claim 9 including:

a control system for controlling movement of said carriage between said first and second positions and for controlling movement of said conveyor between elevated and declined positions with respect to said stack including:

a first actuator for moving said carriage between said first and second positions;

a second actuator for elevating and declining said conveyor;

a motor for driving said conveyor;

a control circuit for controlling said motor and said actuators, respectively, and a controller operably connected to said control circuit to effect traversal of said carriage between said first and second positions, elevation and decline of said conveyor and traversal of said conveyor to move containers therealong.

11. The apparatus set forth in claim 10 including:

third actuator means for gripping and releasing a container and said control circuit is operable for controlling said third actuator means in response to signals from said controller.

12. The apparatus set forth in claim 9 wherein:

said apparatus includes actuator means for moving said conveyor between elevated and declined positions.

13. The apparatus set forth in claim 12 including:

bearings supported on said apparatus frame for supporting said conveyor for pivotal movement with respect to said apparatus frame about an axis of a shaft, said shaft supporting roller means engaged with endless belt means on said conveyor.

14. The apparatus set forth in claim 13 including:

drive motor means drivingly coupled to said shaft for driving said endless belt means.

15. The apparatus set forth in claim 9 wherein:

said conveyor includes endless belt means supported on a conveyor frame and a shaft supporting said conveyor on said apparatus frame.

16. The apparatus set forth in claim 15 wherein:

said shaft is mounted in opposed bearings mounted on said apparatus frame for rotation about a longitudinal axis of said shaft and said conveyor frame includes spaced apart bearings engageable with said shaft for supporting said conveyor on said shaft.

17. The apparatus set forth in claim 15 wherein:

said shaft comprises a drive shaft of said conveyor, said drive shaft being drivably engageable with a roller for driving said endless belt means.

18. The apparatus set forth in claim 17 including:

a drive motor drivingly connected to said drive shaft whereby said drive shaft is rotatable in bearings supporting said drive shaft on said apparatus frame and said conveyor is supported by said drive shaft for pivotal movement about a central longitudinal axis of said drive shaft.

19. An apparatus for unstacking and transferring a plurality of containers from a stack of said containers comprising:

an apparatus frame;

a shaft mounted on said apparatus frame;

an endless belt conveyor including a conveyor frame mounted on said shaft, substantially at one end of said conveyor for pivotal movement relative to said apparatus frame;

a first actuator for moving said conveyor with respect to said apparatus frame between elevated and declined positions;

a carriage mounted for linear movement on and along said conveyor between a first position for engaging a container and a second position for releasing said container;

a second actuator for moving said carriage between said positions of said carriage, respectively;

a gripper mounted on said carriage and operable to engage a container and grip said container for moving said container from said stack to said conveyor; and at least a third actuator for actuating said gripper to grip and release said container, respectively.

20. The apparatus set forth in claim 19 wherein:

said shaft is mounted in opposed bearings mounted on said apparatus frame for rotation about a longitudinal axis of said shaft and said conveyor frame includes spaced apart bearings engageable with said shaft for supporting said conveyor on said shaft.

21. The apparatus set forth in claim 20 wherein:

said shaft comprises a drive shaft of said conveyor, said drive shaft being drivably engageable with a roller for driving endless belt means of said conveyor.

22. The apparatus set forth in claim 19 wherein:

said shaft supporting said conveyor comprises a drive shaft connected to a roller for driving an endless belt of said conveyor.

23. The apparatus set forth in claim 22 including:

a drive motor drivingly engaged with said drive shaft.

24. The apparatus set forth in claim 23 wherein:

said actuators are pressure fluid operated and said apparatus includes a control circuit including respective control valves for controlling flow of pressure fluid to said actuators, respectively, and a controller operably connected to said control circuit to effect operation of said actuators and of said drive motor to provide traversal of said carriage between said positions, elevation and decline of said conveyor, gripping and releasing a container, and traversal of said conveyor to move containers therealong.

25. The apparatus set forth in claim 19 wherein:

said carriage includes a carriage frame including roller means supported on tracks on said conveyor frame for supporting said carriage on said conveyor.

26. The apparatus set forth in claim 25 wherein:

said gripper includes opposed arms spaced apart and supported on said carriage frame, said arms supporting container gripping fingers mounted thereon and movable between a first position for releasing said container and a second position for gripping said container for moving said container from said stack to said conveyor.

27. The apparatus set forth in claim 26 wherein:

said gripper comprises an elongated gripper shaft supporting said opposed arms and mounted on said carriage frame for limited movement relative to said carriage frame in response to engagement of a container by said gripper.

28. An apparatus for unstacking and transferring a container from a stack of said containers comprising:

an apparatus frame;

a conveyor mounted on said apparatus frame for conveying containers from said stack;

a carriage including a carriage frame and a container gripper mounted thereon, said carriage being mounted for movement relative to said conveyor between a first position for engaging and gripping a container and removing a container from said stack and a second position for depositing said container on said conveyor;

said conveyor including a conveyor frame for supporting said carriage for movement between said first position for engaging and gripping a container and said second position for depositing said container on said conveyor;

said gripper comprises an elongated gripper shaft mounted on said carriage frame for limited pivotal movement relative to said carriage frame in response to engagement of said container by said gripper, said gripper shaft supporting spaced apart arms supporting container gripping fingers thereon, said gripping fingers being movable between a first position for releasing said container and a second position for gripping said container for moving said container from said stack to said conveyor.

* * * * *